United States Patent [19]

Coldren

[11] 4,128,255
[45] Dec. 5, 1978

[54] ROCKING BOLSTER UTILIZING SHOCK ABSORBERS

[75] Inventor: Kenneth M. Coldren, Fort Wayne, Ind.

[73] Assignee: M & W Gear Company, Gibson City, Ill.

[21] Appl. No.: 766,001

[22] Filed: Feb. 7, 1977

[51] Int. Cl.² .................. B62D 9/00; B62D 37/00
[52] U.S. Cl. ............................ 280/143; 280/111
[58] Field of Search .............. 280/111, 112 R, 145, 280/179 R, 143, 148; 296/35 R

[56] References Cited

U.S. PATENT DOCUMENTS

| 3,497,231 | 2/1970 | Fulmer | 280/111 |
|---|---|---|---|
| 3,805,908 | 4/1974 | Thompson | 280/111 |

*Primary Examiner*—Philip Goodman
*Attorney, Agent, or Firm*—Allegretti, Newitt, Witcoff & McAndrews

[57] ABSTRACT

An improved rocking bolster wagon includes a horizontal support member suspended between a pair of wheels in a running gear to define a flat, horizontal surface upon which a curved bolster member is positioned. The curved bolster member is retained in position by means of a pair of shock absorbers which have their opposite ends attached respectively to the curved bolster member and the bolster support.

5 Claims, 3 Drawing Figures

ROCKING BOLSTER UTILIZING SHOCK ABSORBERS

BACKGROUND OF THE INVENTION

This invention relates to a rocking bolster wagon and, more particularly, to a four-wheeled vehicle wherein a non-rocking bolster may be provided for the rear wheels and a rocking bolster may be provided for the front or steerable wheels. Apparatus of this type is shown generally is U.S. Pat. No. 3,341,216 issued to John O. Bradford on Sept. 12, 1967, which is incorporated herewith by reference. The present invention constitutes an improvement over the structure shown in U.S. Pat. No. 3,341,216.

The rocking bolster construction as shown in the prior art Bradford patent provided an adequate structure to prevent tipping and promote stabilization of a loaded wagon. However, even with such structure, some undesirable sway is observed in "high gravity" wagons, i.e., wagons having a high center of gravity. Additionally, travel over rough terrain often results in movement or "jumping" of the rocking bolster from its support bar and subsequent impact of the entire weight of the wagon on the support bar and wheel axle or spindles. This produces damage to the axle or spindles of the wagon.

In an effort to overcome such difficulties, the improvement of the present invention was conceived and reduced to practice.

SUMMARY OF THE INVENTION

In a principal aspect, the present invention comprises the improvement in a rocking bolster wagon of shock absorbing means positioned to retain a curved bolster member in an appropriate position relative to a planar bolster support member attached to running gear for the wagon. Preferably, the shock absorbing means comprise a pair of shock absorbers arranged on opposite sides of the point of normal tangent contact between the rocking bolster member and its support member. In a preferred embodiment, the line of contraction and expansion of the shock absorbing means is coincident with a radius of curvature of the curved surface of the rocking bolster member.

Thus, it is an object of the present invention to provide an improved rocking bolster construction which incorporates shock absorbing means.

A further object of the present invention is to utilize shock absorbing means in a rocking bolster to retain the bolster member in constant contact with the planar support member.

Another object of the present invention is to provide an improved rocking bolster construction which constitutes an improvement over the construction shown in U.S. Pat. No. 3,341,216 and further which may be retrofitted on such a prior art construction.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
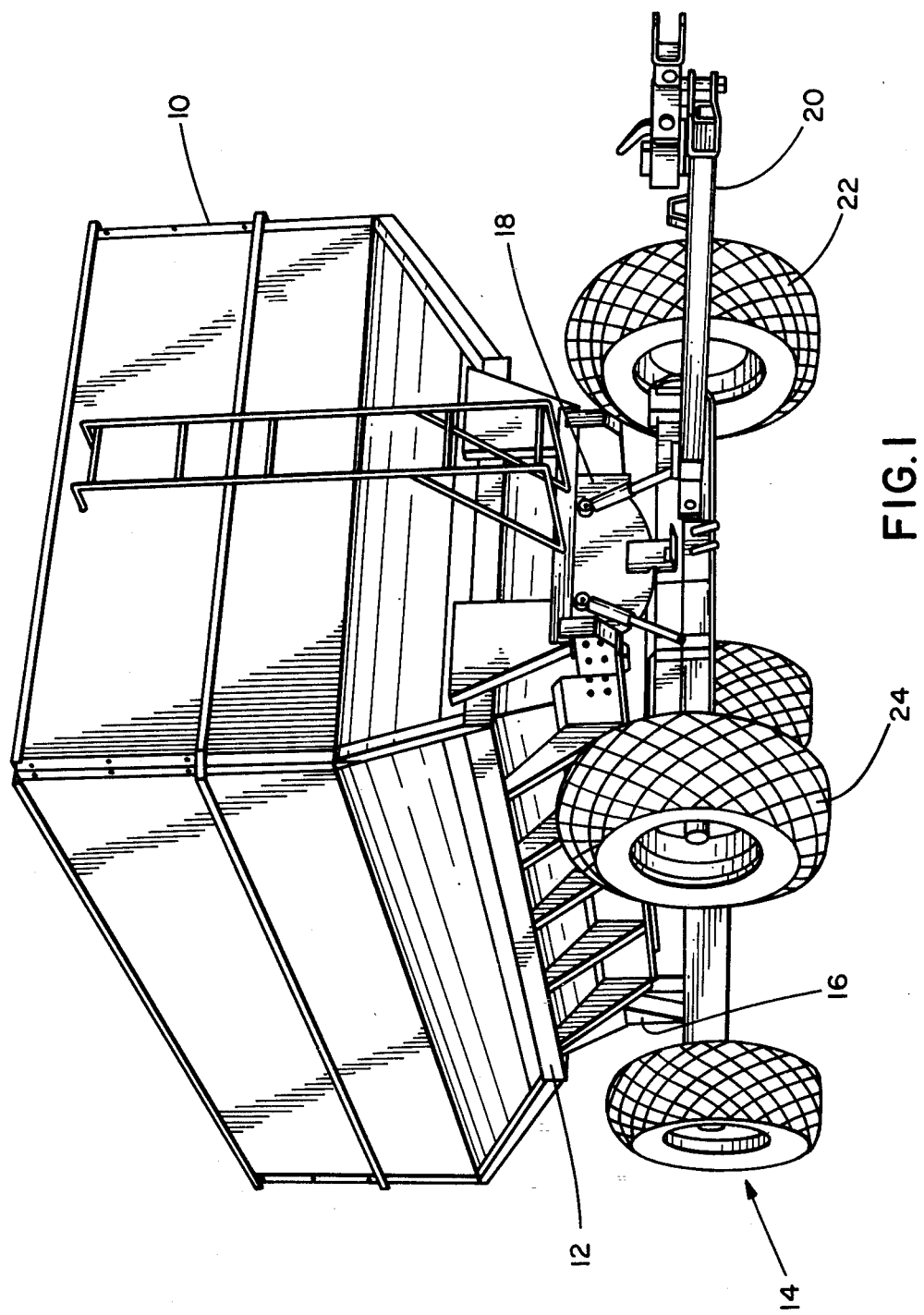
FIG. 1 is a perspective view of a typical high gravity farm wagon incorporating the improvement of the present invention.

FIG. 1 illustrates, in a perspective view, a typical high gravity farm wagon. The wagon includes a hopper 10 mounted on a support frame 12. The support frame 12 is attached to a running gear 14 by means of a non-rocking support linkage 16 at the rear end of the wagon and a rocking bolster support mechanism 18 at the front end of the wagon. A tongue 20 is attached to the running gear 14 and operates to pivot wheels 22 and 24 in order that the wagon may be steered.

The present invention relates to the particular construction of the rocking bolster support mechanism 18. The invention is not to be restricted to inclusion in combination with any particular vehicle or at the front or steerable end of a farm wagon. It is contemplated that such a bolster mechanism may be utilized in other vehicles either at the forward or rear end.

Figure 2:
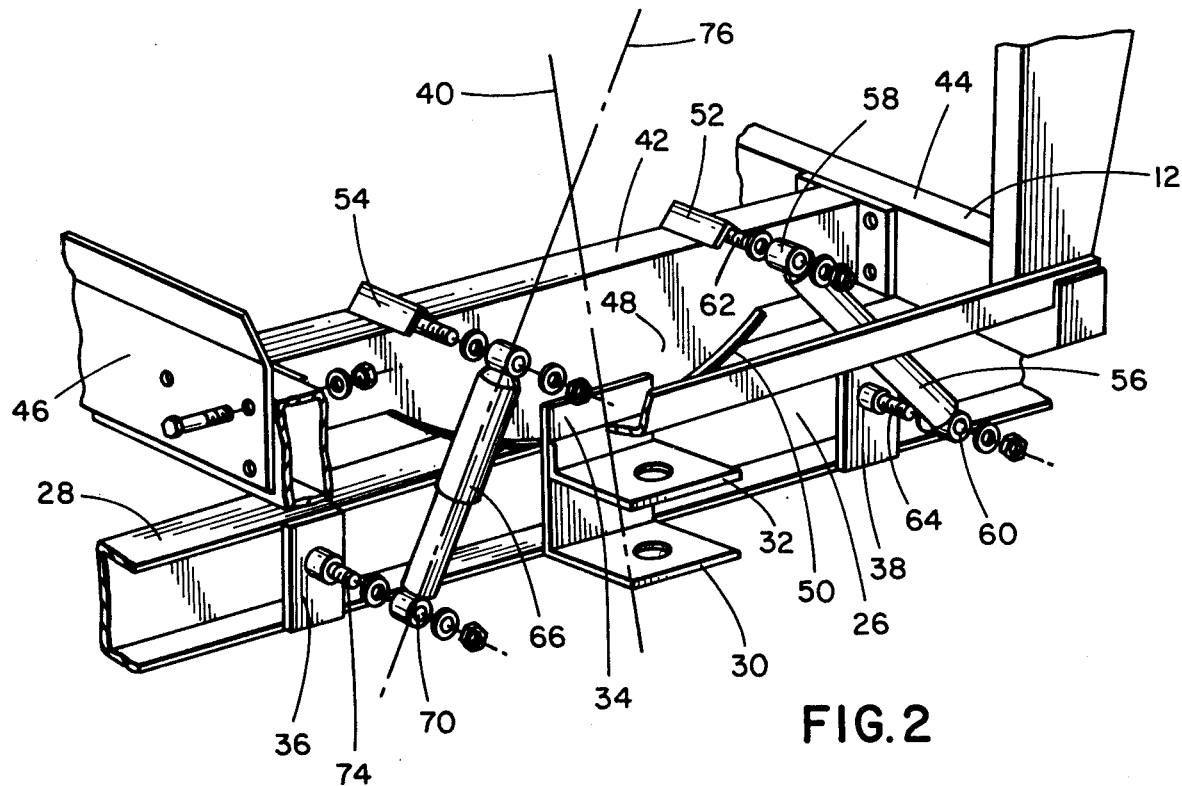
FIG. 2 is an enlarged partial, perspective view of the improved rocking bolster construction used on the farm wagon as shown in FIG. 1.

Referring to FIG. 2, a portion of the running gear 14 includes a bolster support bar or member 26 which is positioned transverse to the direction of vehicle travel. Support member 26 includes a top planar surface 28. Approximately at the mid point of bar 26 between wheels 22 and 24, first and second spaced, horizontal hitch bar plates 30 and 32 are positioned for cooperation with tongue 20. The plates 30 and 32 are thus vertically spaced and welded to a vertical retaining plate 34. A second retaining plate (not shown) is positioned on the opposite side of bar 26 from plate 34 and extends vertically above top surface 28 to the same extent that retaining plate 34 extends above top surface 28. Retaining plate 34 and the opposed plate (not shown) define a support channel for a rocking bolster member 42.

Spaced lower weldments 36 and 38 are positioned equidistant from a vertical centerline axis 40 through the retaining plate 34.

Bolster member 42 is attached to wagon support frame 12 and extends transversely between frame members 44 and 46. The bolster member 42 includes a curved section 48 having a curved rocking plate or surface 50. The plate 50 has a substantially constant radius of curvature and engages surface 28 at a tangent line of contact which is generally parallel to the direction of vehicle travel. When the vehicle is at a rest position and the bolster support bar is maintained in a substantially horizontal position, the tangent line of connection between bolster member 42 and support surface 28 is substantially at the midpoint of the member 26 and, thus, intersects vertical axis 40.

Spaced weldments 52 and 54 are provided at the top surface of bolster member 42 for cooperation with shock absorber means as described below.

A first shock absorber 56 has opposite ends 58 and 60 which are connected respectively to threaded bolts 62 and 64 projecting from the weldments 52 and 38. The shock absorber 56 thus expands or contracts along a line defined between bolts 62 and 64. This line may be termed a contraction or expansion axis.

In a similar manner, a second shock absorber 66 includes ends 68 and 70 cooperative with bolts 72 and 74 associated with weldments 54 and 36, respectively. A contraction axis is similarly defined for the shock absorber 66 and is identified as contraction axis 76.

In a preferred embodiment of the present invention, a radius of curvature of plate 50 coincides with the contraction axis of shock absorbers 56 and 66. That is, the axis 76 associated with absorber 66 passes through the center of a circle defined by rocking plate surface 50. Similarly, the expansion axis of absorber 56 lies on a radius of curvature of plate 50. Thus, the upper weldments 52, 54 and lower weldments 36, 38 are equispaced from axis 40. Relative to the spacing of lower weldments 36, 38, upper weldments 52, 54 are more narrowly spaced.

Figure 3:
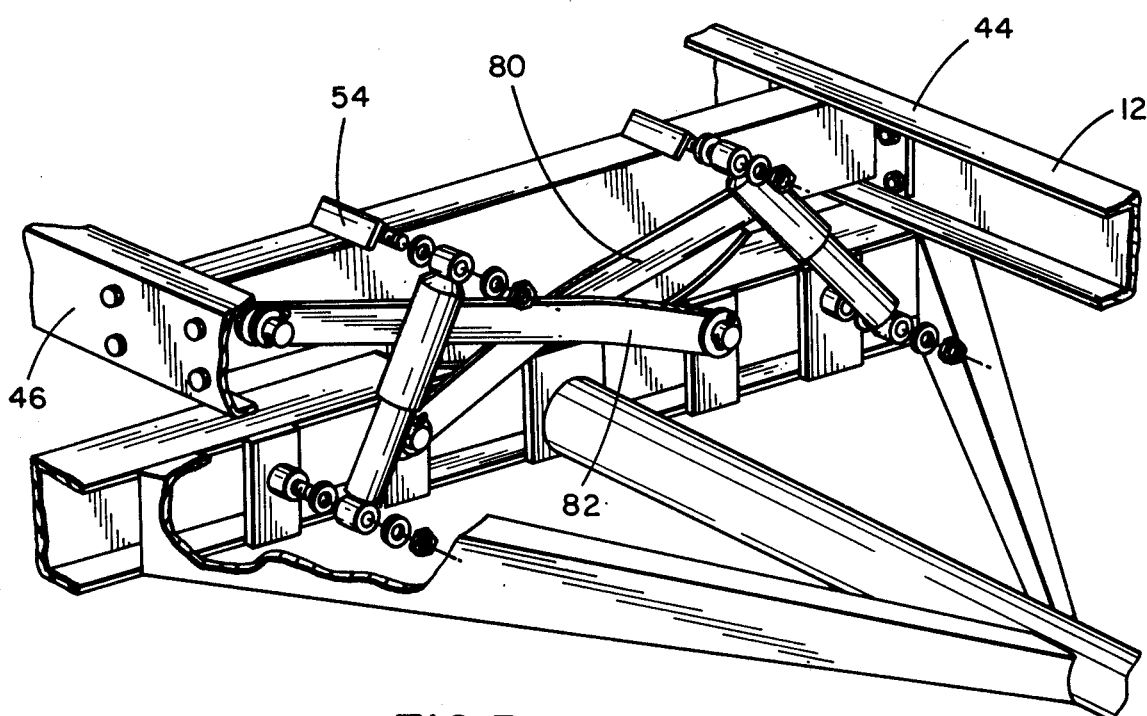
FIG. 3 is an alternate embodiment of the improved rocking bolster construction of the present invention as incorporated with a rocking bolster structure as disclosed in U.S. Pat. No. 3,341,216, said patent being incorporated herewith by reference.

FIG. 3 depicts an embodiment of the invention which utilizes a pair of connecting links 80 and 82 in combination with shock absorbers. Like parts of FIGS. 2 and 3 are labeled with like numbers. The structure of FIG. 3 is substantially the same as that shown and described in FIG. 2. In addition, however, link 80 connects support bar 26 with bolster member 42. In a similar fashion link 82 connects support bar 26 with bolster member 42. The structure and operation of the links 80 and 82 is set forth in U.S. Pat. No. 3,341,216 which is incorporated herewith by reference.

With the structure of the present invention, movement and impact of the rocking bolster against the support bar 26 is substantially reduced. This eliminates or reduces wear upon spindles associated with the wheels 22 and 24. As a result, it has been observed in units so far incorporating the improvement of the present invention that damage to spindles has been reduced by half during in-service operation. In addition, the stability of such wagons has been greatly enhanced enabling them to travel at somewhat higher speeds and through turns with improved efficiency. Thus, while there has been set forth a preferred embodiment, it is to be understood that the invention shall be limited only by the following claims and their equivalents.

What is claimed is:

1. In a rocking bolster vehicle of the type including a bolster member having a curved rocking surface, a bolster support member having a planar top surface for support of said curved rocking surface, said curved rocking surface being adapted to rock on said top surface, and means for confining the bolster member against translational movement on the support member, said means for confining including the improvement of a pair of shock absorbing means having opposite ends attached respectively to the bolster member and the support member, the ends attached to the bolster member being attached on opposite sides of a center line axis through the bolster member and support member defined by the point of tangency of the bolster member and support member when said members are maintained in a horizontal level condition, the ends of said shock absorbing means attached to the support member likewise being positioned on opposite sides of the center line axis.

2. The improvement of claim 1 wherein the spacing of the ends attached to the bolster member is less than the spacing of the ends attached to the support member.

3. The improvement of claim 1 wherein said ends are attached to the bolster member at an equal distance on opposite sides of the center line axis.

4. The improvement of claim 1 wherein the ends attached to the support member are attached at equal distances on the opposite side of the center line axis.

5. The improved structure of claim 1 including a pair of substantially horizontal links, one end of each link being pivotally connected to said support member adjacent the outer end thereof whereby said links extend from opposite ends of said support member toward the center of said bolster member, said links being crossed with the other end of each link being pivotally connected to said bolster member, said links and said shock absorbing means being operable to also prevent upward movement of said bolster member away from said supporting member and thereby retain said rocker element in substantial contact with said top surface at all times.

* * * * *